US012569955B2

(12) United States Patent
Holzmeier et al.

(10) Patent No.: US 12,569,955 B2
(45) Date of Patent: Mar. 10, 2026

(54) POWER TOOL HAVING A FRONT HANDLE AND A REGULATING UNIT

(71) Applicant: Hilti Aktiengesellschaft, Schaan (LI)

(72) Inventors: Georg Holzmeier, Martkoffingen (DE); Roland Meuer, Ettringen (DE)

(73) Assignee: Hilti Aktiengesellschaft, Schaan (LI)

( * ) Notice: Subject to any disclaimer, the term of this patent is extended or adjusted under 35 U.S.C. 154(b) by 317 days.

(21) Appl. No.: 18/038,480

(22) PCT Filed: Nov. 11, 2021

(86) PCT No.: PCT/EP2021/081385
§ 371 (c)(1),
(2) Date: May 24, 2023

(87) PCT Pub. No.: WO2022/117309
PCT Pub. Date: Jun. 9, 2022

(65) Prior Publication Data

US 2024/0100645 A1 Mar. 28, 2024

(30) Foreign Application Priority Data

Dec. 4, 2020 (EP) .................................... 20211908

(51) Int. Cl.
*B24B 27/08* (2006.01)
*B25F 5/00* (2006.01)
*B25F 5/02* (2006.01)

(52) U.S. Cl.
CPC .............. *B24B 27/08* (2013.01); *B25F 5/008* (2013.01); *B25F 5/02* (2013.01)

(58) Field of Classification Search
CPC ....... B24B 27/08; B24B 23/00; B24B 23/005; B23Q 11/1092; B25F 5/02; B25F 5/008
See application file for complete search history.

(56) References Cited

U.S. PATENT DOCUMENTS 2,709,446 A * 5/1955 Miller ..................... B25B 7/126
92/108
3,971,906 A 7/1976 Sahrbacker et al.
5,577,600 A 11/1996 Schoene et al.
5,890,292 A 4/1999 Stark et al.
6,591,826 B1 * 7/2003 Donnerdal ............. B23Q 11/10
451/344
(Continued)

FOREIGN PATENT DOCUMENTS

AU 2008246247 A1 12/2008
CN 208971909 U * 6/2019
(Continued)

OTHER PUBLICATIONS

International Search Report of PCT/EP2021/081394 dated Jan. 24, 2022.
(Continued)

*Primary Examiner* — Carlos A. Rivera
(74) *Attorney, Agent, or Firm* — Davidson Kappel LLC

(57) ABSTRACT

A power tool having at least one front handle and a tool, wherein the tool can be cooled with a cooling liquid during the operation of the power tool. The power tool has a regulating unit for providing the cooling liquid, wherein the regulating unit has a valve for setting a quantity of cooling liquid and is integrated on the front handle.

15 Claims, 6 Drawing Sheets

(56) References Cited

U.S. PATENT DOCUMENTS

| | | | |
|---|---|---|---|
| 6,812,425 | B1 | 11/2004 | Wong et al. |
| 8,062,100 | B2 | 11/2011 | Layher et al. |
| 2005/0205406 | A1 | 9/2005 | Wong et al. |
| 2006/0260453 | A1 | 11/2006 | Layher et al. |
| 2007/0240313 | A1 | 10/2007 | Layher et al. |
| 2010/0288907 | A1 | 11/2010 | Schweinberger et al. |
| 2010/0301245 | A1 | 12/2010 | Accurso et al. |
| 2011/0214657 | A1 | 9/2011 | Okumi et al. |
| 2013/0180116 | A1 | 7/2013 | Yokohama et al. |
| 2015/0367432 | A1 | 12/2015 | Karlson et al. |
| 2015/0367496 | A1 | 12/2015 | Kaupp et al. |
| 2017/0008159 | A1 | 1/2017 | Boeck et al. |
| 2017/0110266 | A1 | 4/2017 | Chiang et al. |
| 2018/0281086 | A1 | 10/2018 | Greitmann et al. |
| 2021/0053175 | A1 | 2/2021 | Otani et al. |
| 2022/0118596 | A1 | 4/2022 | Hatakeyama et al. |

FOREIGN PATENT DOCUMENTS

| | | | |
|---|---|---|---|
| DE | 4334933 | A1 | 4/1995 |
| DE | 102005002126 | A1 | 7/2006 |
| DE | 102014208980 | A1 | 7/2015 |
| DE | 202020002472 | U1 | 7/2020 |
| EP | 3173187 | A1 | 5/2017 |
| EP | 3415280 | A1 | 12/2018 |
| JP | 2006198765 | A | 8/2006 |
| JP | 2013527383 | A | 6/2013 |
| JP | 2016203326 | A | 12/2016 |
| JP | 2017109404 | A | 6/2017 |
| WO | WO 03061913 | A1 | 7/2003 |
| WO | WO 2007069946 | A1 | 6/2007 |
| WO | WO 2019194036 | A1 | 10/2019 |
| WO | WO 2020110543 | A1 | 6/2020 |
| WO | WO2022117308 | A1 | 6/2022 |
| WO | WO2022117309 | A1 | 6/2022 |
| WO | WO2022117310 | A1 | 6/2022 |
| WO | WO2022117311 | A1 | 6/2022 |
| WO | WO2022117409 | A1 | 6/2022 |

OTHER PUBLICATIONS

International Search Report of PCT/EP2021/0821797 dated Feb. 4, 2022.
International Search Report of PCT/EP2021/081385 dated Feb. 24, 2022.
International Search Report of PCT/EP2021/081389 dated Feb. 24, 2022.
International Search Report of PCT/EP2021/081383 dated Dec. 22, 2021.

* cited by examiner

POWER TOOL HAVING A FRONT HANDLE AND A REGULATING UNIT

The present invention relates to a power tool having at least one front handle and a tool, wherein the tool can be cooled with a cooling liquid during the operation of the power tool.

BACKGROUND

In the power tool sector, cut-off grinders by means of which, for example, cuts can be made even in substrates which are hard and are difficult to machine, such as concrete, are known. In the context of the invention, such cut-off grinders are preferably referred to as concrete cut-off grinders. Such cut-off grinders, which are provided even for cutting concrete, require a coolant, which may, for example, comprise water, for cooling the cutting disk used as a tool. In order to regulate the supply of the coolant, a valve is conventionally provided, which firstly is intended to set and issue the water flow and secondly to regulate the quantity of water. These valves are generally attached directly to the connection of the water hose, or they are fastened externally, as an additional assembly, to the generally used circumferential handle of the cut-off grinder.

SUMMARY OF THE INVENTION

However, the types of attachment mentioned have substantial disadvantages. Firstly, the conventional attachment location, which is known from the prior art, constitutes an ergonomically disadvantageous position since access is difficult to the operation of the valve and, for this purpose, at least one hand of the user has to leave the holding position on the handle. This leads in particular to problems whenever the valve is attached directly to the water connection of the power tool, and constitutes a risk for the user since, when the device is in operation, it can be held now only with one hand. Frequently, however, for assessing the supplied quantity of cooling liquid, the power tool has to be in operation since it is possible to assess only by means of the rotating cutting disk whether cooling water is sufficiently entering the region of the cutting segments. In other words, it can be checked in particular during the operation of the cut-off grinder whether the supplied quantity of cooling water is sufficient to bring about a sufficiently effective cooling of the cutting disk.

On the other hand, an additional attachment to the circumferential handle is generally exposed and susceptible to damage during the operation of the power tool and in particular in the event of drops, since the valve is not additionally protected against impacts.

One problem on which the present invention is based consists in overcoming the above-described defects and disadvantages of the prior art and in providing a power tool in which the valve for supplying a cooling liquid for cooling the tool of the power tool is readily protected against drops and impacts. Moreover, the valve is intended to be readily accessible and visible for the user, such that ergonomic handling of the power tool is made possible. It would furthermore be desirable if, in the case of the power tool to be provided, the coolant connection itself could likewise be readily protected in relation to mechanical damage, wherein the coolant connection comprises in particular a hose for supplying the coolant to the tool of the power tool.

According to the invention, a power tool having at least one front handle and a tool is provided, wherein the tool can be cooled with a cooling liquid during the operation of the power tool. The power tool has a regulating unit for providing the cooling liquid, wherein the regulating unit has a valve for setting a quantity of cooling liquid and is integrated on the front handle. The invention advantageously permits the preferably complete integration of the regulating unit in the front handle of the power tool, which signifies a departure from conventional installation locations of the regulating unit or of the valve in power tools. In this way, in particular better visibility and improved access of the valve lever can be made possible. This makes it easier for the user of the power tool to operate the cooling liquid supply or to set the quantity of cooling liquid. In addition, by means of the integrated attachment to the front handle of the power tool, the valve or the regulating unit can be arranged in a particularly well protected position of the power tool, and therefore, by means of the integration of the valve or of the regulating unit in the front handle, an undesirable breaking off of the valve lever in the event of drops and relatively great impacts during the use or the operation of the power tool is reliably avoided. In the context of the invention, the regulating unit may preferably also be referred to as a valve unit.

The power tools can preferably be a cut-off grinder or a concrete cut-off grinder. The regulating unit for the cooling liquid and the valve are preferably completely surrounded by the front handle and are thus particularly effectively protected against large impacts, such as, for example, in the event of drops. In the context of the present invention, the attachment of the valve at a location that is easily accessible for the user is advantageous. This applies in particular wherein the user, during operation of the valve, wants to operate the power tool and hold it stably with their hands. In particular, the invention enables the valve to be attached in an ergonomically favorable position for regulating the cooling water since the valve lever is very readily visible and reachable for the user.

For the purposes of the invention, it is preferred that the front handle of the power tool or of the cut-off grinder is in the form of a circumferential handle. The term "circumferential" is not an unclear term for a person skilled in the art since they know that front handles in the region of the power tools conventionally run around the housing or the main body of the device. In other words, such front handles at least partially surround the housing or the main body of the power tool, as a result of which, firstly, stable guiding of the power tool by the user is made possible. Secondly, the machine is effectively protected by the preferably circumferential front handle against mechanical damage, for example against impacts or when dropped.

The front handle is conventionally enclosed by the left hand in the case of right-handed people. In particular, larger machines frequently have a second handle which, for the purposes of the invention, is referred to as a rear handle. The rear handle is conventionally enclosed by the right hand in the case of right-handed people. It can preferably be in the form of a C- or D-shaped handle. For the purposes of the invention, it is preferred that the power tool comprises both a first, front handle and a second, rear handle. The above-described disadvantages of the conventional installation locations of the valve of a power tool, in particular of a (concrete) cut-off grinder, can advantageously be avoided by the substantially complete integration of the valve or of the regulating unit in the front handle of the power tool. The cooling liquid supply is substantially completely surrounded here by the preferably circumferential handle and thus protected against heavy impacts, for example in the event of drops. The attachment of the regulating unit at a location that is easily accessible for the user is also advantageous here. This is the case in particular whenever, for the operation of the valve, the user would want to continue to hold the preferably two handles of the cut-off grinder with their hands.

During operation of the power tool, the tool of the machine rotates and can generate a cut in a substrate to be machined. If the power tool is a cut-off grinder or a concrete cut-off grinder, the tool is preferably a substantially circular cutting disk which can be fitted with diamonds ("diamond cutting disk") to improve the cutting power or cutting-off power. During the generation of the cut in the substrate to be machined, heat is also produced, which is conventionally dissipated by the supply of a coolant, in particular a cooling liquid. In other words, a cooling liquid can be used for cooling the tool of the power tool. In yet other words, a preferably fluid coolant can be used for cooling the cutting disk of the power tool. The cooling liquid can preferably be water but which may be provided with additives. Owing to the preferred use of water as coolant, the valve, for the purposes of the invention, may preferably also be referred to as a water valve. The valve is part of the regulating unit, wherein the regulating unit is configured to discharge a quantity of cooling liquid, that can be set with the valve lever, into the region of the cutting disk of the power tool. It is preferred here that the quantity of cooling liquid or cooling water can be set preferably steplessly between 0 and 100%. For the purposes of the invention, this means preferably that the valve, for example, can be substantially completely closed (flow quantity: approx. 0% of a maximum possible or nominal flow quantity) or can be substantially completely open (flow quantity: approx. 100% of a maximum possible or nominal flow quantity). Of course, however, all intermediate values between 0 and 100% can also be set by means of the valve, such as, for example, 3%, 10%, 16.67%, 25%, 30%, 33.3%, 45%, 50%, 75%, 83.3% or 98%, without being restricted thereto.

For the purposes of the invention, it is preferred that the front handle comprises an opening for receiving the regulating unit. In other words, an opening for the regulating unit is provided on the front, preferably circumferential handle of the power tool, in order to integrate the water valve in the front handle. For the purposes of the invention, it is preferred that the opening is substantially completely surrounded by the handle. The regulating unit can then be attached in this opening.

For the purposes of the invention, it is preferred that the valve comprises a valve body, wherein the valve body has an upper linear guide and a lower linear guide for guiding the valve body in the opening of the front handle. For the purposes of the invention, it is particularly preferred that the valve body in its upper and in its lower region in each case has a linear guide to the front handle. A particular advantage of this preferred refinement of the proposed power tool is that a lateral guide can be provided by two linear guides at the top and bottom of the valve body. For the purposes of the invention, it is preferred that the guides each comprise at least one groove, wherein the grooves interact with tongues on the front handle of the power tool. In other words, it is preferred that the front handle has tongues which interact with the grooves of the upper and lower linear guides in such a manner that the valve body can be introduced in a stable and uncomplicated manner into the opening of the front handle.

For the purposes of the invention, it is preferred that the linear guides each comprise a tongue-and-groove connection. In other words, for the purposes of the invention, it is preferred that the upper guide and/or the lower guide comprises a tongue-and-groove connection. In an alternative refinement of the invention, the tongues can be attached at the top and bottom of the valve body and are guided by in each case two lateral groove guides on the handle. The valve body, for installation, can be introduced into the two groove guides and pressed as far as the end stop on the handle. In order for the regulating unit to remain in the front handle of the power tool, it can be secured in the direction of the linear guides by means of screws or a snap-action connection by means of a snap hook connection. In other words, for the purposes of the invention, it is preferred that the regulating unit is held in the front handle by a fastening means. Said fastening means can be, for example, screws or a snap-action connection. For the purposes of the invention, it is particularly preferred that a snap hook connection is used in order to fasten or to hold the regulating unit in the handle or in the opening thereof.

For the purposes of the invention, it is preferred that the regulating unit of the power tool comprises a connection for a hose, in order to provide the cooling liquid. This connection preferably constitutes an intersection between the hose on the one side and the regulating unit or the valve on the other side. For the purposes of the invention, it is preferred that the intersection is designed in such a manner that a simple and also rapidly releasable installation of the hose is made possible. The hose is preferably the same hose with which the cooling liquid is guided from the regulating unit to the protective hood or to the tool of the cut-off grinder. For the purposes of the invention, it is preferred that the hose connection is arranged on that side of the regulating unit which faces the tool or the protective hood of the cut-off grinder. Said hose preferably leaves the regulating unit on that side of the front handle of the cut-off grinder which likewise faces the tool or the protective hood of the cut-off grinder.

Tests have shown that the connection for a hose, in order to provide the cooling liquid, is particularly readily protected against mechanical external influences, such as impacts or drops, within the scope of the present invention. In particular, the invention permits a protected connection of the connecting hose to the valve for conducting the cooling water to the protective hood. The provision of the intersection between the hose and the valve or the regulating unit in particular permits particularly good protection of the preferably internal water connection by the circumferential handle, which particularly effectively prevents the intersection from breaking off, for example, during operation of the power tool and in the event of drops. The connection for a hose for supplying the coolant to the tool of the power tool can preferably be integrated in the front handle. For the purposes of the invention, it is preferred that the coolant connection is particularly readily protected from mechanical damage, wherein the coolant connection comprises in particular a hose for supplying the coolant. For the purposes of the invention, it is preferred also to refer to the hose as an intermediate hose or connecting hose.

The hose connection is preferably configured in such a manner that it is easily fittable and also releasable again for the user. For the purposes of the invention, it is preferred that the hose connection is arranged downstream of the regulating unit in the direction of flow of the cooling liquid. The region "downstream of the regulating unit in the direction of flow of the cooling liquid" is the region which follows the regulating unit in the direction of flow and which is arranged in particular between the regulating unit and a cooling liquid connection of the tool of the power tool. The tool of the power tool is preferably designed as a cutting disk and is conventionally surrounded by a protective hood. For the purposes of the invention, it is preferred that said protective hood of the tool of the power tool has a connection for the cooling liquid hose, such that cooling liquid can be transported by said hose from the valve or from the regulating unit to the tool of the power tool. The connection region for the cooling liquid hose on the regulating unit is advantageously arranged in such a manner that it is particularly readily protected by the surrounding front handle and cannot break off in the event of drops. For the purposes of the invention, it is preferred to refer to the hose connection as a second connection of the regulating unit.

Next to the hose connection, which lies downstream of the regulating unit in the direction of flow of the cooling liquid, the regulating unit can have a further connection through which cooling liquid can enter the regulating unit. For the purposes of the invention, this connection may also be referred to as a first connection of the regulating unit. For the purposes of the invention, it is preferred that said first connection of the regulating unit is arranged upstream of the regulating unit in the direction of flow of the cooling water. By means of the first connection of the regulating unit, in particular a connection of the regulating unit to the domestic water supply or to a water management system can be produced, in order to ensure the supply of water to the power tool.

For the purposes of the invention, it is preferred that the cooling liquid enters the regulating unit through the first connection and leaves the regulating unit through the second connection. From the second connection of the regulating unit, the cooling liquid passes into the intermediate hose through which the cooling liquid is conducted or transported in the direction of the tool of the power tool. The preferred direction of flow of the cooling liquid is shown in FIG. 3.

Further advantages will become apparent from the following description of the figures. The figures, the description and the claims contain numerous features in combination. A person skilled in the art will expediently also consider the features individually and combine them to form useful further combinations.

BRIEF DESCRIPTION OF THE DRAWINGS

Identical and similar components are denoted by the same reference signs in the figures. In the figures.

DETAILED DESCRIPTION

Figure 1:
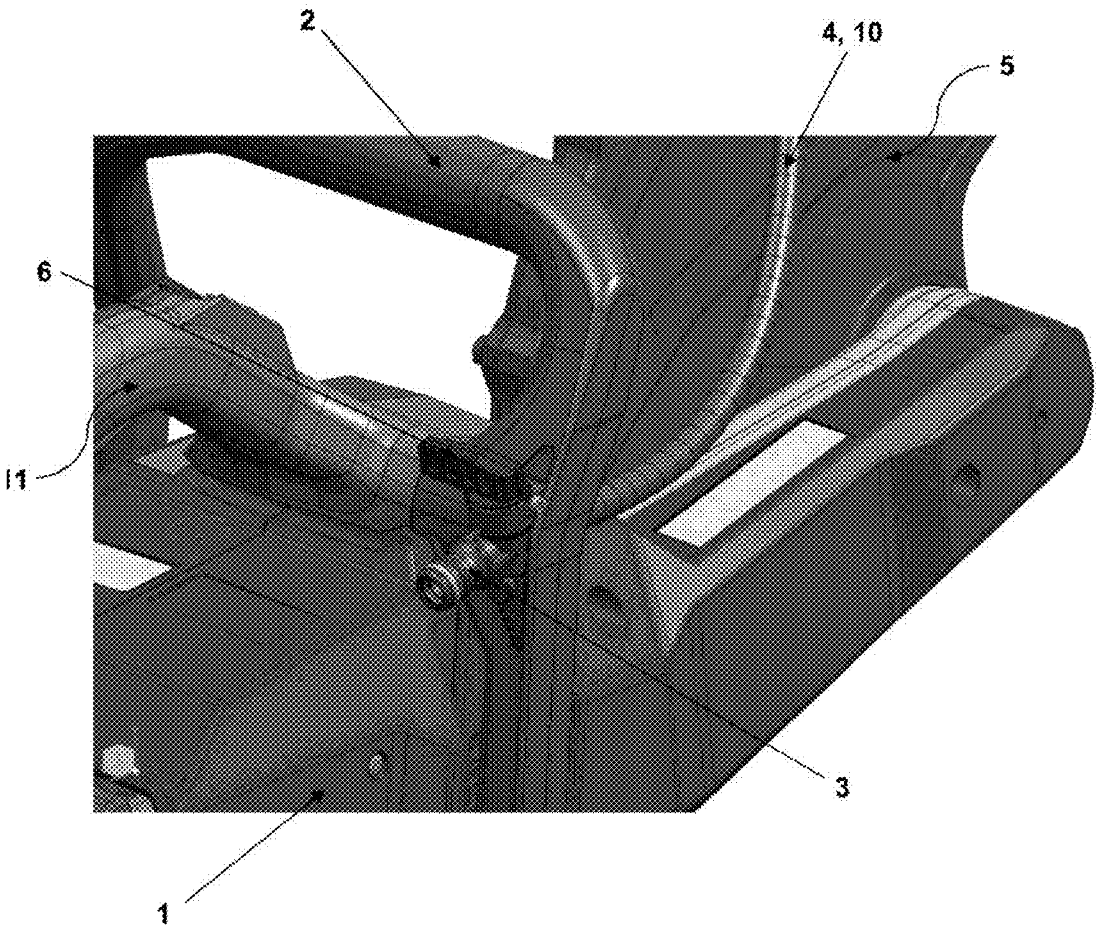
FIG. 1 shows a view of a preferred refinement of the valve or of the regulating unit and the arrangement thereof on the power tool

FIG. 1 shows a view of a preferred refinement of the valve 6 and the arrangement thereof on the power tool 1. FIG. 1 looks from a rear region of the power tool 1 in the direction of the tool 5 of the power tool 1. Between the front handle 2 of the power tool 1 and the protective hood of the tool 5 of the power tool there is arranged a hose 10 with which cooling liquid 4 can be conducted from the valve 6 or from a regulating unit 12 to the tool 5. The power tool 1 can be a cut-off grinder which is capable in particular of introducing cuts into a concrete substrate. The tool 5 of the cut-off grinder 1 is in this case in particular a cutting disk which can be covered in relation to the user of the power tool 1 by a protective hood (without a reference sign). The power tool 1 preferably comprises a front handle 2 and a rear handle 11, wherein the valve 6 and the regulating unit 12 are in particular integrated on the front handle 2 of the cut-off grinder 1. The regulating unit 12 can furthermore have a first connection 3 for the cooling liquid 4 by which the cooling liquid 4 can pass into the regulating unit 12 (see, e.g, FIG. 5).

Figure 2:
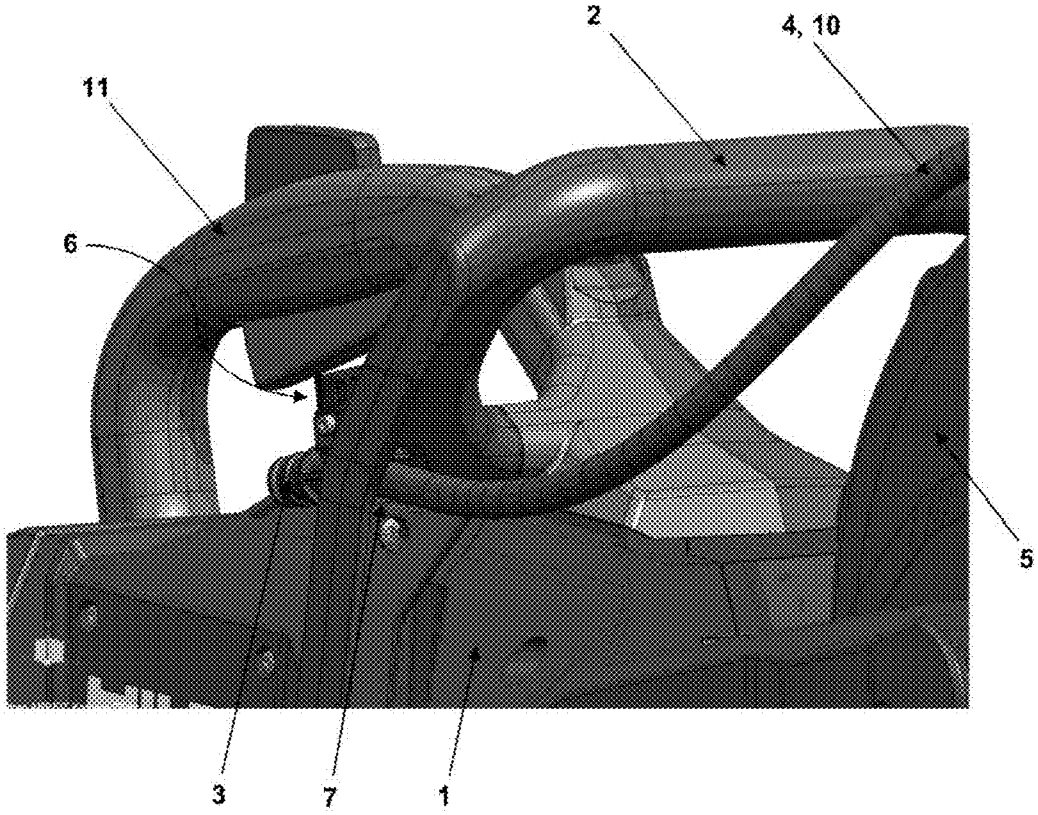
FIG. 2 shows a view of a preferred refinement of the valve of the regulating unit and the arrangement thereof on the power tool
Figure 3:
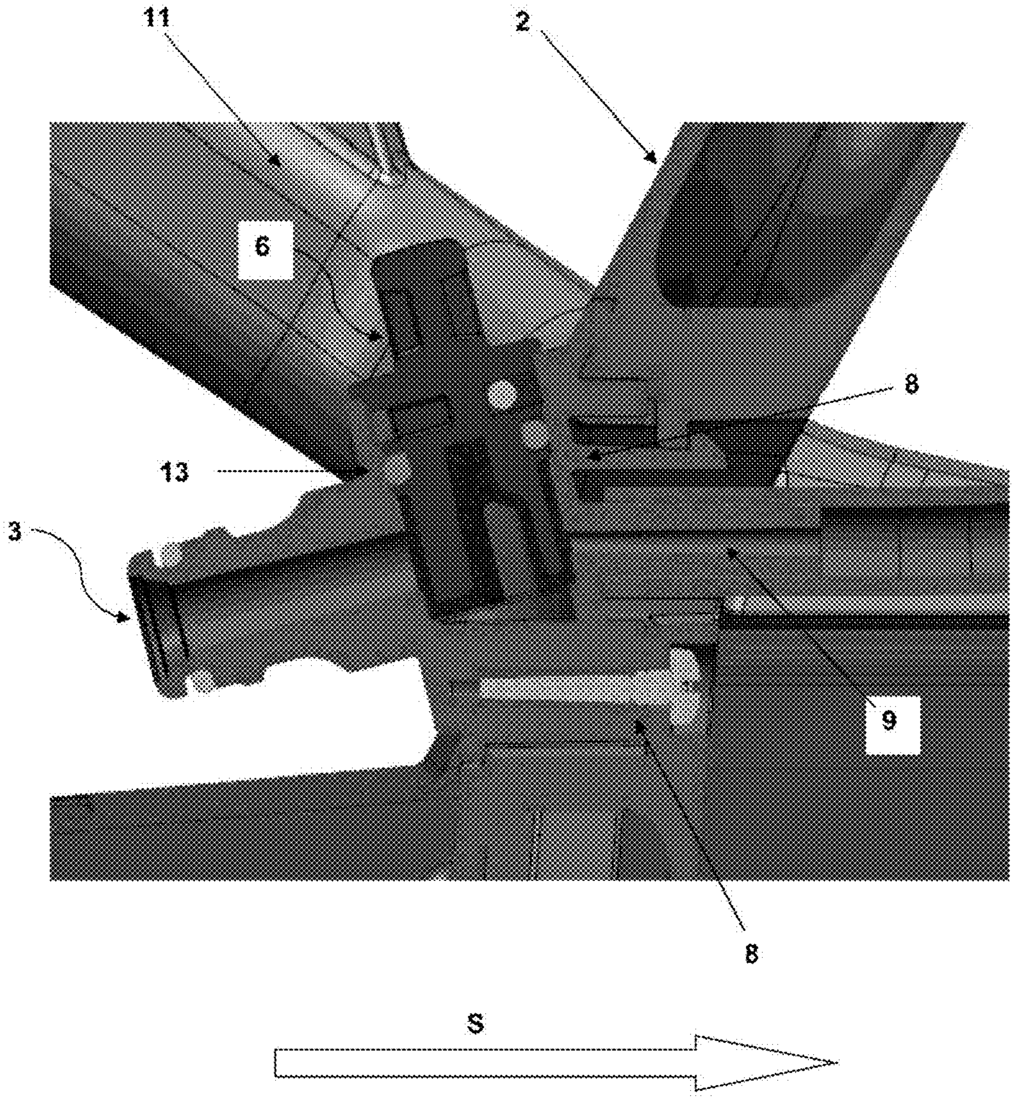
FIG. 3 shows a sectional illustration of a preferred refinement of the valve of the regulating unit
Figure 4:
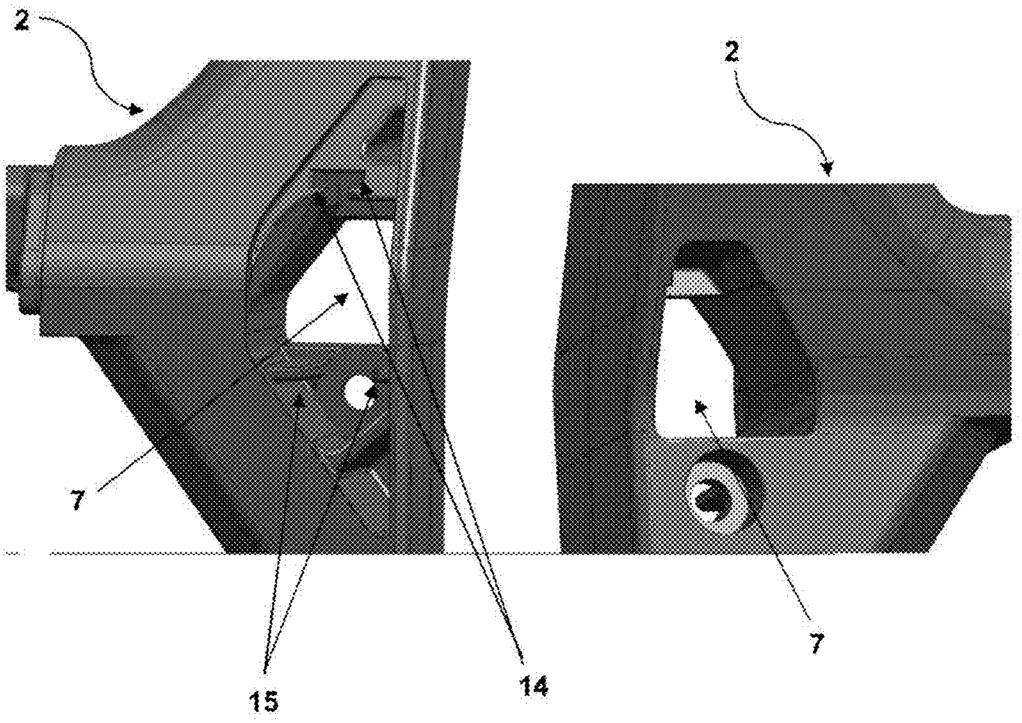
FIG. 4 shows a detailed view of a preferred refinement of the front handle and of the opening for receiving the regulating unit

For this purpose, the front handle 2 can comprise an opening 7 which is illustrated in FIGS. 2 and 4. FIG. 2 shows a view of a preferred refinement of the valve 6 or of the regulating unit 12 and the arrangement thereof on the power tool 1. FIG. 2 looks from the protective hood of the cutting disk 5 in the direction of the rear handle 11 of the power tool 1. A regulating unit 12 for the quantity of cooling liquid 4, with which the cutting disk 5 is cooled, can be introduced into the opening 7 of the front handle 2. This regulating unit 12 comprises in particular a first connection 3 for the cooling liquid 4, and the valve 6. The regulating unit 12 is illustrated in particular also in FIG. 5. The first connection 3, through which cooling liquid 4, in particular cooling water, can enter the regulating unit 12, is illustrated in FIG. 3 on the left half of the regulating unit 12.

FIG. 3 shows a sectional illustration of a preferred refinement of the valve 6 or of the regulating unit 12 and the arrangement thereof on the power tool 1. The front handle 2 and the regulating unit 12 for the cooling liquid 4 are illustrated in the foreground of FIG. 3, while the rear handle 11 of the power tool 1 is illustrated in the background of FIG. 3. It is provided in the context of the invention that the power tool 1 comprises a regulating unit 12 for the cooling liquid 4, wherein the valve 6 is part of the regulating unit 12. Furthermore, the regulating unit 12 comprises a first connection 3 for the cooling liquid 4. In addition to said first connection 3 for the cooling liquid 4, the regulating unit 12 also comprises fastening means 8 with which the regulating unit can be fastened to the power tool 1. In other words, the fastening means 8 can be part of the regulating unit 12. The fastening means 8 are preferably configured to fasten the regulating unit 12 or the valve 6 to the power tool 1 or to the front handle 2.

So that the regulating unit 12 remains in the front handle 2 of the cut-off grinder 1, the regulating unit 12 or the valve 6 can be fastened to the power tool 1 with screws and/or a snap-action connection as fastening means 8. The fastening means 8 can in particular comprises a snap hook connection with which the regulating unit 12 or the valve 6 can be secured on the power tool 1. For the purposes of the invention, it is particularly preferred that a snap hook connection is used as the fastening means 8 in order to fasten the valve 6 or the regulating unit 12 in the front handle 2 or in the opening 7 thereof.

FIG. 3 furthermore illustrates a connection 9 for the hose 10 (see, e.g, FIG. 1), wherein the cooling liquid 4 can be conducted with the hose 10 in the direction of the cutting disk 5. The connection 9 is preferably part of the regulating unit 12; for the purposes of the invention, it is preferably also referred to as second connection or hose connection which lies downstream of the regulating unit 12 in the direction of flow of the cooling liquid 4. For the purposes of the invention, it is preferred that the connection 9 for the hose 10 is integrated in the front handle 2 of the power tool 1. The hose connection 9 can preferably also be referred to as an intersection. The second connection 9, through which the cooling liquid 4 leaves the regulating unit 12, is illustrated in FIG. 3 on the right side of the regulating unit 12. Furthermore, FIG. 3 illustrates the direction of flow S of the cooling liquid 4 by means of the arrow in the lower half of the image.

FIG. 4 shows a detailed view of a preferred refinement of the front handle 2 and of the opening 7 for receiving the regulating unit 12 of the power tool 1. FIG. 4 in particular illustrates a lower linear guide 15 on the front handle 2 of the power tool 1, which guide can have tongues, for example on both sides. Said tongues can interact with grooves which are parts of a counterpart of the lower linear guide 15 on a valve body 13 of the valve 6 of the regulating unit 12. Said grooves of the lower linear guide 15 of the valve body 13 are preferably present on both sides of the valve body and are illustrated in FIG. 5.

Furthermore, FIG. 4 shows an upper linear guide 14 which is arranged on the front handle 2 and has a respective groove on both sides. Said grooves can interact with tongues which are parts of a counterpart of the upper linear guide 14 on the valve body 13 of the valve 6 of the regulating unit 12. Said tongues of the upper linear guide 14 of the valve body 13 are preferably present on both sides of the valve body and are illustrated in FIG. 5.

Figure 5:
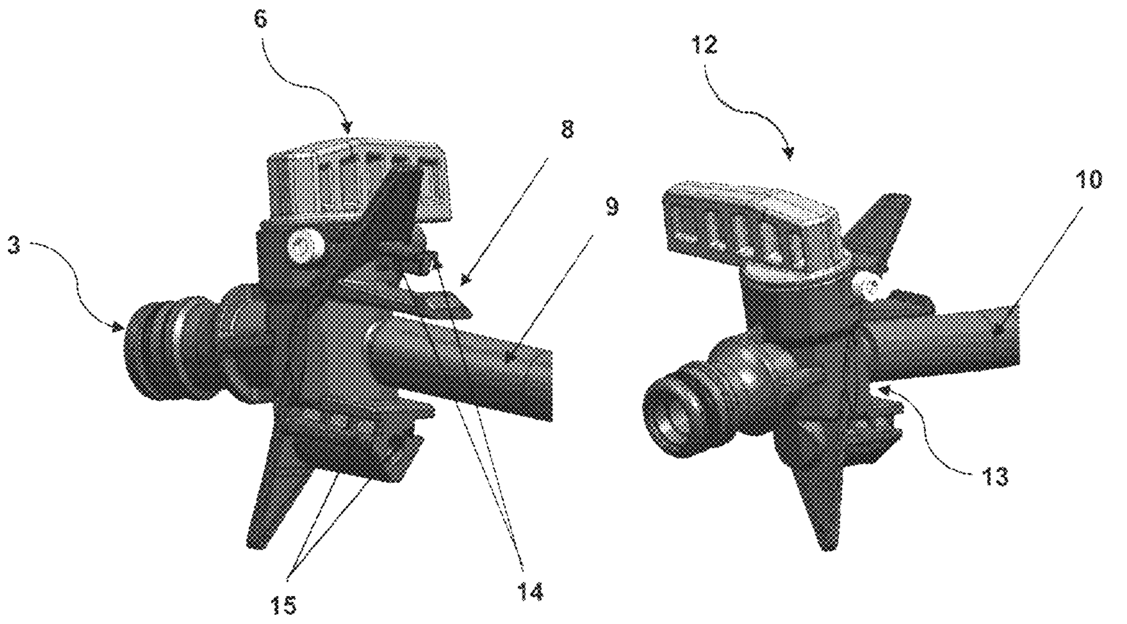
FIG. 5 shows various views of preferred embodiments of the cooling liquid regulating unit of the power tool

FIG. 5 shows various views of preferred embodiments of the cooling liquid regulating unit 12 of the power tool 1. In particular, the valve 6, the first connection 3, the second connection 9 and the hose 10, and the fastening means 8 can be seen.

Figure 6:
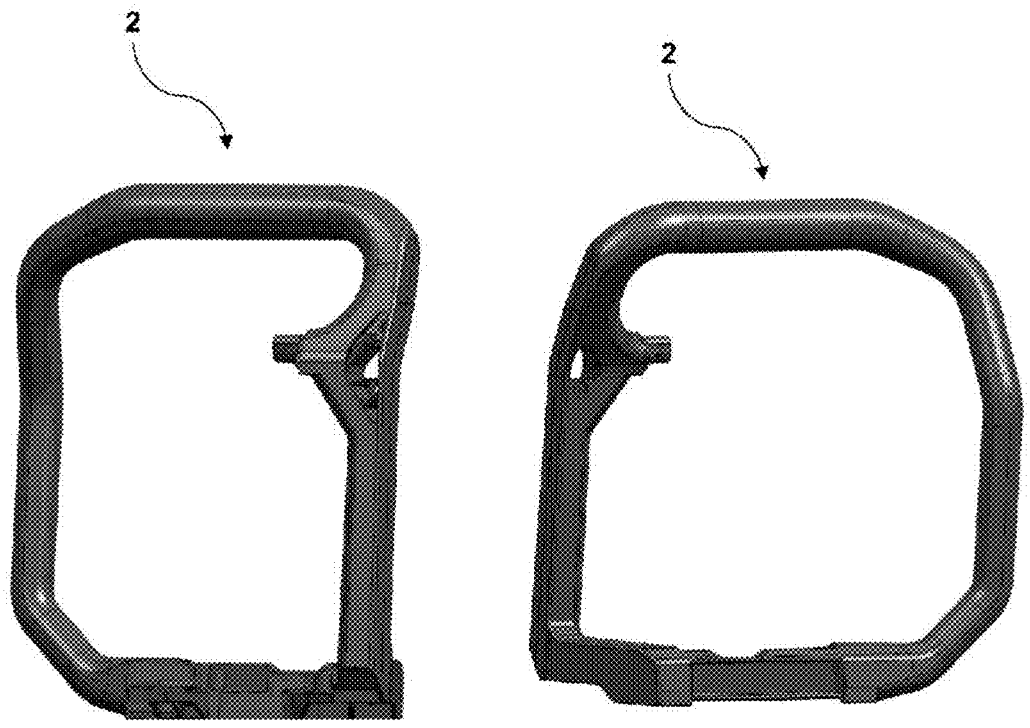
FIG. 6 shows various views of preferred embodiments of the front handle of the power tool

FIG. 6 shows various views of preferred embodiments of the front handle 2 of the power tool 1.

LIST OF REFERENCE SIGNS

- 1 Power tool
- 2 Front handle
- 3 Feed for the cooling liquid for cooling the tool of the power tool, first connection
- 4 Cooling liquid
- 5 Tool of the power tool
- 6 Valve
- 7 Opening for receiving the valve
- 8 Fastening means
- 9 Connection, second connection
- 10 Hose
- 11 Rear handle
- 12 Regulating unit
- 13 Valve body
- 14 Upper linear guide
- 15 Lower linear guide
- S Direction of flow of the cooling liquid

What is claimed is:

1. A power tool comprising:

at least one front handle;

a tool, the tool coolable with a cooling liquid during the operation of the power tool; and a regulator for providing the cooling liquid, wherein the regulator has a valve for setting a quantity of cooling liquid, the front handle including an opening for receiving the regulator, the opening oriented perpendicular to the front handle, the regulator being integrated on the opening of the front handle.

2. The power tool as recited in claim 1 wherein the front handle is in the form of a circumferential handle.

3. The power tool as recited in claim 1 wherein the valve includes a valve body having an upper linear guide and a lower linear guide for guiding the valve body in the opening.

4. The power tool as recited in claim 3 wherein the upper linear guide or the lower linear guide includes a tongue-and-groove connection.

5. The power tool as recited in claim 3 wherein the guides each include at least one groove, the grooves interacting with tongues on the front handle of the power tool.

6. The power tool as recited in claim 1 wherein the regulator is held in the front handle by a fastener.

7. The power tool as recited in claim 1 wherein the regulator includes a connection for a hose to provide the cooling liquid.

8. The power tool as recited in claim 7 wherein the connection is integrated in the front handle.

9. The power tool as recited in claim 1 further comprising a rear handle.

10. The power tool as recited in claim 1 wherein the valve includes a valve body having two upper linear guides and two lower linear guides for guiding the valve body in the opening.

11. The power tool as recited in claim 10 wherein the two upper linear guides and the two lower linear guides each include at least one groove, the grooves interacting with tongues on the front handle of the power tool.

12. The power tool as recited in claim 8 wherein the connection is a releasable connection.

13. The power tool as recited in claim 1 wherein the regulator is held in the front handle via a snap hook connection.

14. A method for operating the power tool as recited in claim 1, the method comprising cooling the tool with the cooling liquid, the cooling liquid being water.

15. The power tool as recited in claim 1 wherein the power tool is a cut-off grinder with a cutting disk.

* * * * *